US008892658B2

(12) United States Patent
Gupta et al.

(10) Patent No.: US 8,892,658 B2
(45) Date of Patent: Nov. 18, 2014

(54) BREAK-THROUGH MECHANISM FOR PERSONAS ASSOCIATED WITH A SINGLE DEVICE

(75) Inventors: Anoop Gupta, Woodinville, WA (US); Mary P. Czerwinski, Woodinville, WA (US); Roger S. Barga, Bellevue, WA (US); Pavel Curtis, Bellevue, WA (US); Paul J. Hough, North Bend, WA (US); Richard J. McAniff, Bellevue, WA (US); Raymond E. Ozzie, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1477 days.

(21) Appl. No.: 12/098,697

(22) Filed: Apr. 7, 2008

(65) Prior Publication Data

US 2011/0045806 A1    Feb. 24, 2011

(51) Int. Cl.
| | |
|---|---|
| *G06F 15/16* | (2006.01) |
| *G06Q 10/10* | (2012.01) |
| *H04M 3/436* | (2006.01) |
| *H04L 12/58* | (2006.01) |
| *H04L 29/08* | (2006.01) |
| *H04M 3/42* | (2006.01) |

(52) U.S. Cl.
CPC .............. *H04M 3/436* (2013.01); *G06Q 10/107* (2013.01); *H04L 51/14* (2013.01); *H04L 51/24* (2013.01); *H04L 67/24* (2013.01); *H04M 3/42229* (2013.01)
USPC .......................................... 709/206; 709/207

(58) Field of Classification Search
CPC ................. G06Q 10/107; H04L 51/00–51/38; H04L 67/22–67/26
USPC ................................................... 709/201–207
See application file for complete search history.

(56) References Cited

U.S. PATENT DOCUMENTS

| | | | | |
|---|---|---|---|---|
| 5,493,692 | A | * | 2/1996 | Theimer et al. .............. 455/26.1 |
| 6,452,614 | B1 | | 9/2002 | King et al. |
| 6,499,021 | B1 | * | 12/2002 | Abu-Hakima .................. 706/10 |
| 6,745,040 | B2 | | 6/2004 | Zimmerman |
| 6,745,193 | B1 | * | 6/2004 | Horvitz et al. ................ 707/796 |
| 7,007,067 | B1 | * | 2/2006 | Azvine et al. ................. 709/206 |

(Continued)

OTHER PUBLICATIONS

Gross, Tom, Simone Braun, and Susanne Krause. "MatchBase: A development suite for efficient context-aware communication." Parallel, Distributed, and Network-Based Processing, 2006. PDP 2006. 14th Euromicro International Conference on. IEEE, 2006.*

(Continued)

*Primary Examiner* — Patrice Winder
*Assistant Examiner* — Julian Chang
(74) *Attorney, Agent, or Firm* — Dan Choi; Judy Yee; Micky Minhas

(57) ABSTRACT

A single device that receives communications intended for a user having multiple contact addresses associated with different user roles is provided. The single device can receive communications intended for multiple telephone numbers, email aliases, screen names, aliases, other means of contact, or combinations thereof. Since a user engaged in a particular role might not desire to be interrupted with communications intended for a different role, the communications for the other roles can be maintained until the user is actively engaged in the role for which the communication was intended. In situations where there is an important communication sent to a non-active role, selective convergence between roles is initiated and the important communication is presented to the user.

20 Claims, 9 Drawing Sheets

(56) References Cited

U.S. PATENT DOCUMENTS

| | | | |
|---|---|---|---|
| 7,069,259 B2* | 6/2006 | Horvitz et al. | 706/25 |
| 7,073,129 B1* | 7/2006 | Robarts et al. | 715/740 |
| 7,076,504 B1 | 7/2006 | Handel et al. | |
| 7,137,069 B2 | 11/2006 | Abbott et al. | |
| 7,162,237 B1 | 1/2007 | Silver et al. | |
| 7,209,916 B1* | 4/2007 | Seshadri et al. | 1/1 |
| 7,250,846 B2* | 7/2007 | Ebling et al. | 340/7.28 |
| 7,257,415 B2 | 8/2007 | Shostak | |
| 7,293,013 B1* | 11/2007 | Horvitz et al. | 707/694 |
| 7,295,657 B1* | 11/2007 | Keohane et al. | 379/88.23 |
| 7,298,831 B1* | 11/2007 | Keohane et al. | 379/88.23 |
| 7,330,895 B1* | 2/2008 | Horvitz | 709/227 |
| 7,389,351 B2* | 6/2008 | Horvitz | 709/227 |
| 7,406,170 B2* | 7/2008 | Gray et al. | 379/265.02 |
| 7,631,047 B1* | 12/2009 | Adamczyk et al. | 709/207 |
| 7,644,144 B1* | 1/2010 | Horvitz et al. | 709/223 |
| 7,747,719 B1* | 6/2010 | Horvitz et al. | 709/223 |
| 8,161,165 B2* | 4/2012 | Horvitz | 709/227 |
| 8,572,184 B1* | 10/2013 | Cosoi | 709/206 |
| 2002/0087649 A1* | 7/2002 | Horvitz | 709/207 |
| 2002/0144136 A1* | 10/2002 | Stornetta et al. | 713/200 |
| 2003/0014490 A1* | 1/2003 | Bates et al. | 709/206 |
| 2003/0046421 A1* | 3/2003 | Horvitz et al. | 709/238 |
| 2003/0158855 A1* | 8/2003 | Farnham et al. | 707/102 |
| 2004/0002932 A1* | 1/2004 | Horvitz et al. | 706/46 |
| 2004/0002958 A1* | 1/2004 | Seshadri et al. | 707/3 |
| 2004/0002972 A1* | 1/2004 | Pather et al. | 707/6 |
| 2004/0003042 A1* | 1/2004 | Horvitz et al. | 709/204 |
| 2004/0024719 A1* | 2/2004 | Adar et al. | 706/12 |
| 2004/0111477 A1* | 6/2004 | Boss et al. | 709/206 |
| 2004/0111478 A1* | 6/2004 | Gross et al. | 709/206 |
| 2004/0114735 A1* | 6/2004 | Arning et al. | 379/93.24 |
| 2004/0172457 A1* | 9/2004 | Horvitz | 709/207 |
| 2004/0172483 A1* | 9/2004 | Horvitz | 709/240 |
| 2004/0194110 A1* | 9/2004 | McKee et al. | 719/310 |
| 2005/0091072 A1 | 4/2005 | Dunn et al. | |
| 2005/0091184 A1* | 4/2005 | Seshadri et al. | 707/1 |
| 2005/0108329 A1* | 5/2005 | Weaver et al. | 709/204 |
| 2005/0149622 A1* | 7/2005 | Kirkland et al. | 709/207 |
| 2005/0193102 A1* | 9/2005 | Horvitz | 709/220 |
| 2005/0251560 A1* | 11/2005 | Horvitz | 709/206 |
| 2005/0259802 A1* | 11/2005 | Gray et al. | 379/201.01 |
| 2006/0007051 A1* | 1/2006 | Bear et al. | 345/1.1 |
| 2006/0010217 A1* | 1/2006 | Sood | 709/206 |
| 2006/0041583 A1* | 2/2006 | Horvitz | 707/102 |
| 2006/0041648 A1* | 2/2006 | Horvitz | 709/220 |
| 2006/0064739 A1* | 3/2006 | Guthrie et al. | 726/3 |
| 2006/0122967 A1* | 6/2006 | Purkayastha et al. | 707/2 |
| 2006/0206573 A1* | 9/2006 | Horvitz et al. | 709/206 |
| 2007/0071209 A1* | 3/2007 | Horvitz et al. | 379/201.06 |
| 2007/0156656 A1* | 7/2007 | Pather et al. | 707/3 |
| 2007/0168863 A1 | 7/2007 | Blattner et al. | |
| 2007/0282959 A1* | 12/2007 | Stern | 709/206 |
| 2008/0046522 A1* | 2/2008 | Wang et al. | 709/206 |
| 2008/0133685 A1* | 6/2008 | Boss et al. | 709/206 |
| 2008/0172464 A1* | 7/2008 | Thattai et al. | 709/205 |
| 2008/0275864 A1* | 11/2008 | Kim et al. | 707/5 |
| 2009/0006574 A1* | 1/2009 | Horvitz et al. | 709/207 |
| 2009/0070431 A1* | 3/2009 | Malik et al. | 709/206 |
| 2009/0100141 A1* | 4/2009 | Kirkland et al. | 709/206 |
| 2009/0119377 A1* | 5/2009 | Lynch | 709/206 |
| 2009/0125602 A1* | 5/2009 | Bhatia et al. | 709/207 |
| 2009/0138563 A1* | 5/2009 | Zhu et al. | 709/206 |
| 2009/0150507 A1* | 6/2009 | Davis et al. | 709/207 |
| 2009/0164556 A1* | 6/2009 | Siegel et al. | 709/203 |
| 2009/0210509 A1* | 8/2009 | Plumpton | 709/207 |
| 2009/0222742 A1* | 9/2009 | Pelton et al. | 715/753 |
| 2009/0248464 A1* | 10/2009 | Trinh et al. | 705/7 |
| 2009/0265763 A1* | 10/2009 | Davies et al. | 726/3 |
| 2010/0011064 A1* | 1/2010 | Mabry | 709/206 |
| 2010/0070874 A1* | 3/2010 | Adamczyk et al. | 715/745 |
| 2010/0257249 A1* | 10/2010 | May et al. | 709/206 |
| 2010/0287237 A1* | 11/2010 | Gross et al. | 709/204 |
| 2011/0246668 A1* | 10/2011 | Mohler | 709/238 |
| 2011/0270938 A1* | 11/2011 | May et al. | 709/206 |
| 2012/0005230 A1* | 1/2012 | Jhanji | 707/769 |
| 2012/0209927 A1* | 8/2012 | May et al. | 709/206 |

OTHER PUBLICATIONS

Danninger, Maria, et al. "The connector: facilitating context-aware communication." Proceedings of the 7th international conference on Multimodal interfaces. ACM, 2005.*

Braun, Simone, and Andreas Schmidt. "Don't annoy the informal teacher: Context-aware mediation of communication for workplace learning."Proceedings of the 6th International Conference on Knowledge Management (I-KNOW 06). 2006.*

Schiaffino, Silvia, and Analia Amandi. "The IONWI Algorithm: Learning when and when not to interrupt." Artificial Intelligence in Theory and Practice. Springer US, 2006. 21-30.*

Sengupta, et al. Intel. Persona: A Proactive Computing Approach for Mobile Data Services. Sep. 2004. http://download.intel.com/technology/systems/Persona.pdf.

Schmandt, et al. IBM. Everywhere messaging. IBM Systems Journal, vol. 39, 2000. http://www.research.ibm.com/journal/sj/393/part1/schmandt.html.

Net2phone. PICUP. The Personal Internet Communications Unification Project. http://www.picup.com/files/picup_WP_10.pdf. Last accessed Aug. 21, 2007.

Arlein, et al. PrivacyPreserving Global Customization. Oct. 2000. http://www.cs.jhu.edu/~fabian/papers/customize.pdf.

* cited by examiner

BREAK-THROUGH MECHANISM FOR PERSONAS ASSOCIATED WITH A SINGLE DEVICE

BACKGROUND

Wireless mobile technology has become widespread and is utilized for both personal as well as business uses. Mobile devices such as telephones, pagers, personal digital assistants (PDAs), data terminals, and the like, are designed to be carried by those who travel from place to place in the daily course of business, for personal reasons, or for both business and personal reasons.

The appeal of mobile devices is due in large part to the convenience of having such devices available regardless of where the user may be located (e.g., at home, at work, traveling, out of town, and so on). In such a manner, users can easily stay "connected". These computing devices can be accessed at almost any time and place and can contain a tremendous amount of information relating to people, organizations, general interests, and other items. Electronic storage mechanisms have enabled accumulation of massive amounts of data. For instance, data that previously required volumes of books for recordation can now be stored electronically without the expense of printing paper and with a fraction of the physical space needed for storage of paper.

There can be a proliferation of incoming communications (e.g., email, text messages, phone calls, and so forth) and a single individual can receive hundreds of communications in a single day. With this enormous amount of incoming information, it can be difficult to determine which communications are important and should be handled in a reasonable amount of time compared with those that are not as important and can be disregarded for a while. Additionally, the individual receiving the incoming communications has tasks and other duties to perform and might not have much time available for reviewing each incoming communication.

There is a growing trend for users to manage different devices for different functions, roles, or personas. A first device might be utilized for work applications (e.g., a work persona) and a second, separate device might be utilized for personal applications (e.g., a personal persona). For example, a worker might have a mobile business phone and a mobile personal phone. If the worker is conducting an activity relating to their employer, the mobile business phone is utilized. If, however, personal communications are being made, the mobile personal phone is utilized. Thus, those individuals that maintain sharp distinctions between their personal life and their work life must carry duplicate devices, which can be cumbersome as well as costly. Additionally, the user can have duplicate addresses, phone numbers, and so forth, which can make supervising the various incoming communications not only complex but also time-consuming.

While performing one function or role the individual might not maintain communication links associated with the other functions or roles. That is to say, while at work the individual might not receive personal communications and while not at work, the individual might not receive work-related communications. For example, an individual can have two or more email aliases; one related to their function as an employee (e.g., myname@mycompany.com) and the other related to their function as a private individual (e.g., mycode@personalsuff.zxy). If the individual is not at work and an important email (or other communication) is sent to this individual relating to an emergency at work, the individual would not receive the email until the work device is monitored and the work communications reviewed. This can cause problems or consequences that can, at times, be undesirable.

SUMMARY

The following presents a simplified summary in order to provide a basic understanding of some aspects of the disclosed examples. This summary is not an extensive overview and is intended to neither identify key or critical elements nor delineate the scope of such aspects. Its purpose is to present some concepts in a simplified form as a prelude to the more detailed description that is presented later.

In accordance with one or more examples and corresponding disclosure thereof, various aspects are described in connection with providing a single device that can manage multiple personas while allowing a selective communication breakthrough for an individual that maintains a hard transition between a work role and a personal role. When a communication is sent relating to something that is deemed an emergency (e.g., house on fire while the individual is at work), the roles are automatically converged and the individual can receive the urgent communication through the work persona, even though it is was sent to the personal persona. As such, there is a convergence (or break-through mechanism) when a communication is deemed important enough to cross over or disregard roles and/or persona.

To the accomplishment of the foregoing and related ends, one or more examples comprise the features hereinafter fully described and particularly pointed out in the claims. The following description and the annexed drawings set forth in detail certain illustrative aspects and are indicative of but a few of the various ways in which the principles of the various aspects may be employed. Other advantages and novel features will become apparent from the following detailed description when considered in conjunction with the drawings and the disclosed examples are intended to include all such aspects and their equivalents.

DETAILED DESCRIPTION

Various aspects are now described with reference to the drawings. In the following description, for purposes of explanation, numerous specific details are set forth in order to provide a thorough understanding of one or more aspects. It may be evident, however, that the various aspects may be practiced without these specific details. In other instances, well-known structures and devices are shown in block diagram form in order to facilitate describing these aspects.

As used in this application, the terms "component", "module", "system", and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

Various aspects will be presented in terms of systems that may include a number of components, modules, and the like. It is to be understood and appreciated that the various systems may include additional components or modules and/or may not include all of the components and modules discussed in connection with the figures. A combination of these approaches may also be used. The various aspects disclosed herein can be performed on electrical devices including devices that utilize touch screen display technologies and/or mouse-and-keyboard type interfaces. Examples of such devices include computers (desktop and mobile), smart phones, personal digital assistants (PDAs), and other electronic devices both wired and wireless.

Figure 1:
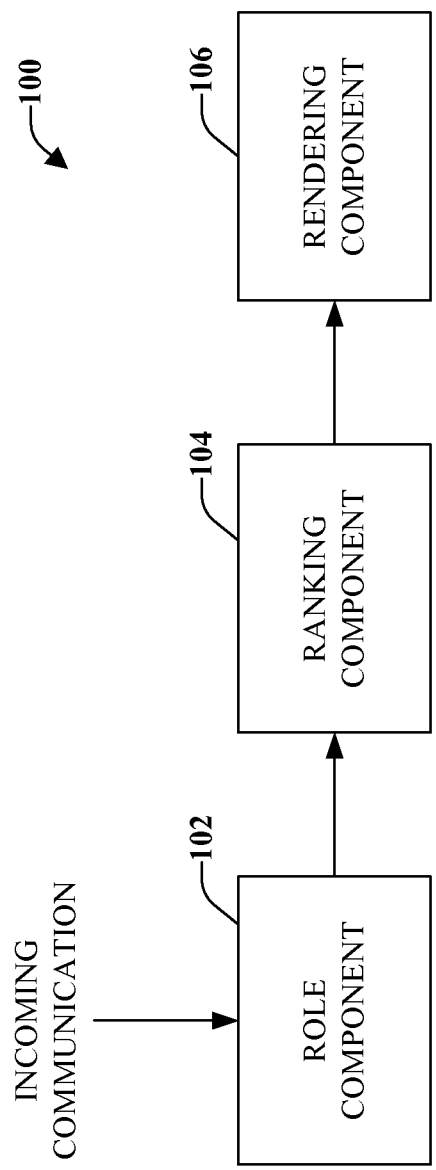
FIG. 1 illustrates a system for persona breakthrough, wherein an incoming communication intended for a particular recipient persona is selectively rendered even though the recipient is not currently engaged in activities associated with the intended persona.

Referring initially to FIG. 1, illustrated is a system 100 for persona breakthrough, wherein an incoming communication intended for a particular recipient persona is selectively rendered even though the recipient is not currently engaged in activities associated with the intended persona. An individual (e.g., recipient of a communication) might desire to receive at a single device communications intended for the different personas engaged in by that individual on a day-to-day basis. There are at least two types of personas or roles: (1) an individual can be associated with their job (e.g., title, position, responsibility) and (2) an individual can be related to a role as a private person (e.g., personal, family). Additionally or alternatively, an individual can be associated with various other personas or roles, such as a member of a club, a member of an organization, a friend, a student, a public figure, a volunteer, a community member, a community activist, and so forth.

All communications can be routed through a single device and only incoming communications intended for a role in which the recipient is currently engaged (e.g., recipient active role) can be presented at substantially the same time as the communication is received. Communications intended for a role (e.g., communication role) in which the recipient is not engaged in at the time of receipt, can be maintained and selectively presented when a transition to the communication role is made. The communications intended for a role that is not the recipient active role can be retained until the recipient active role matches the communication role (e.g., a transition from a first recipient active role to a second recipient active role). However, if the recipient is sent an urgent or otherwise important communication but the communication role does not match the recipient active role, problems can develop especially if the communication is time-sensitive or life threatening. To mitigate important communications not being presented to the recipient in a timely manner, system 100 can facilitate accepting all communications for the individual at a single device and selectively presenting important communications at substantially the same time as the communications are received. Depending on a priority ranking of the incoming communication, the communication can be presented to the recipient regardless of the recipient active role and the communication role (e.g., whether there is a matching of the roles or not).

In further detail, system 100 includes a role component 102 that can be configured to receive incoming communications intended for a device user. The incoming communications can be phone calls, emails, text messages, instant messages, or other forms of communication. The communications can be destined for different telephone numbers, email aliases, or other contact information; however, the final destination is intended for a single individual that desires to maintain a single device. A recipient (e.g., device user) can be known by various contact information, such as one or more email aliases, screen names, phone numbers, or other information by which a sender can contact the recipient.

Role component 102 can be configured to analyze the incoming communication and ascertain the role for which the incoming communication is intended (e.g., communication role) and a role in which the recipient is engaged at the time when the communication is received (e.g., active recipient role). The ascertained communication role can be compared with the identified active recipient role to determine if the roles match (e.g., are the same). If the roles match, the communication can be presented to the user at substantially the same time as the communication is received. If the roles do not match, further analysis of the incoming communication can be performed by a ranking component 104 that can be configured to determine if there is a reason to present the communication to the user at substantially the same time as receipt even through the roles do not match (e.g., an important or high ranking communication).

Ranking component 104 can be configured to prioritize the communication and ascertain a level of importance. In accordance with some aspects, ranking component 104 prioritizes the communication if the communication role and the active recipient role do not match. However, in accordance with other aspects, the incoming communication is prioritized at substantially the same time as role component 102 evaluates the role (e.g., both ranking component 104 and role component 102 perform their respective functions at substantially the same time). In accordance with such aspects, the prioritization can be applied to each incoming communication.

Various criteria can be utilized by ranking component 104 to determine the relative importance of a communication. Such criteria includes key words or phrases included in the communication (e.g., subject line or body of the communication), sender of the communication (based on a sender identification such as a screen name, email alias, phone number, and so forth), historical information (e.g., how similar communications were handled by recipient in the past), the intended communication role, user preferences, policies, rules, as well as other criteria.

The prioritization applied by ranking component 104 can indicate whether the incoming communication is important or not important. However, other indications can be applied, such as a numbering scale (e.g., a higher (or lower) number on the scale indicates more importance), a coding scheme that utilizes multiple levels of importance (e.g., very low, low, medium, high, very important). The priority can be indicated by a threshold level of importance, wherein at or above the threshold level, the communication is important. Below the threshold, the communication can be considered not important. The threshold level can be determined by utilizing more than one criterion and incrementing a counter (or other means of tracking the priority level) for each criterion that is matched as being important. It should be understood that any means of prioritizing communications can be utilized by system 100.

Based on the matching (between the communication role and the active recipient role) and the prioritization (e.g., whether the incoming communication meets or exceeds the threshold level), a rendering component 106 can selectively present the communication to the recipient. If the importance of the communication is ranked high, the communication can be presented at substantially the same time as receipt, whether the roles match or do not match. If the roles do not match and the communication is not ranked as important, the communication can be maintained, such as in a storage medium, until the recipient transitions into an active recipient role that matches the communication role. If the roles match, the communication can be presented to the user at substantially the same time as receipt without regard to the priority level assigned by ranking component 104.

In accordance with some aspects, rendering component 106 selectively presents the communication if a prioritization of the incoming communication meets or exceeds a threshold level of importance even though the matching indicates that the communication roles does not match the recipient active role. In accordance with other aspects, rendering component 106 does not output the communication if the communication roles does not match the recipient active role and the prioritization of the incoming communication does not meet a threshold level.

Thus, a recipient of a communication can be presented with communications that might not conform to a recipient active role (e.g., activities in which the user is engaged). Such selective interruption (e.g., break-through) of the recipient with communications unrelated to a current activity can help the recipient maintain a level of confidence that important communications are not missed because the user is engaged in a persona or role that is different from the role of the important communication.

Figure 2:
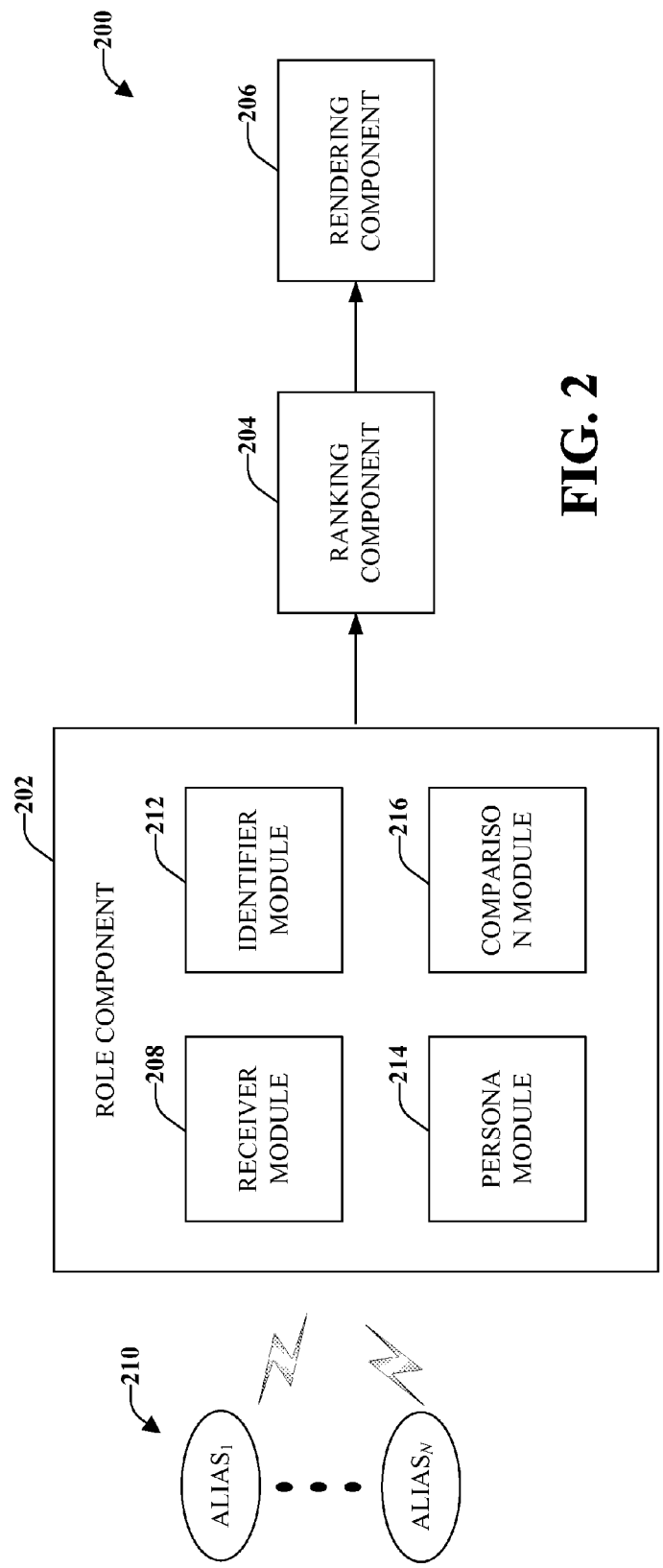
FIG. 2 illustrates another system for presenting communications received at a single device and interrupting a current activity of the user if the received communication is an important communication.

FIG. 2 illustrates another system 200 for presenting communications received at a single device and interrupting a current activity of the user if the received communication is an important communication. The communications received at the single device can be sent to various alias information, wherein more than one type of alias information is routed through the single device. System 200 is similar to the above system and includes a role component 202 that determines a communication role and an active recipient role, a ranking component 204 that priorities the incoming communication, and a rendering component 206 that selectively presents the incoming communication to the recipient. Presenting the communication to the user even though the roles do not match, can interrupt the current activity of the user, if an importance level of the communication meets or exceeds a threshold level.

In further detail, role component 202 receives one or more incoming communications intended for various roles engaged in by the recipient. A single individual can be known to different people based on diverse interactions. For example, an individual can be a volunteer at a non-profit animal rights organization. The other volunteers and staff members at the non-profit organization might be aware that the individual has a full-time job, a family, and attends night-classes at a local college. However, the friends at the non-profit organization might only associate the individual in her role as a volunteer at the non-profit organization. In fact, the individual might have a contact alias (e.g., email) for others to contact her at non-profit organization, depending on the type of volunteering. In some situations, the volunteer might desire to have a phone number at which the volunteer can be contacted without compromising the privacy of the individual (e.g., home number, work number). Thus, system 200 can allow the individual to be known by a contact alias as it relates to volunteering at the non-profit organization and receive communications relating to the volunteer position at a single device that also receives communications intended for the other roles engaged in by the individual (e.g., spouse, parent, student, co-worker, employee, and so on). The individual can selectively accept communications at the single device while mitigating the need to possess multiple devices and/or manually request the communications (e.g., log onto a different email account).

Role component 202 can include a receiver module 208 that be configured to receive communications directed (or addressed to) multiple contact pseudonyms (e.g., email alias, phone number, and so on), labeled $Alias_1$ through $Alias_N$, where N is an integer, and referred to collectively as aliases 210. The sender of the communication might not be aware of the other aliases or pseudonyms by which the device user is known and/or might not be aware of the other personas or roles (e.g., contact aliases) by which the device user might be known.

Also associated with role component 202 can be an identifier module 212 that can be configured to determine or evaluate a recipient role for which an incoming communication is intended (e.g., communication role). The identifier module 212 can answer the question: Is the communication intended for the recipient in his work role or in his family role (or another role associated with the recipient)? To answer the question, key words or key phrases in the subject or body of the communication can be evaluated. For example, if a phrase in the communication is "meeting report due now", the key words can be "meeting" and "report", which can indicate that the communication role is that of a work role. However, if the communication indicates, "House Fire" might indicate that the communication role is the personal role. In accordance with some aspects, the question can be answered by identifying the sender of the communication (e.g., if sender is "boss" it is intended for the work role, if sender is "swimming buddy" it is intended for a friend role or team role, and so on).

The recipient can have two or more different telephone numbers or alias information, distinguished by role (e.g., a personal email alias, a work email alias, and so on), that are received at a single device. Thus, the analysis by identifier module 212 can include matching the alias information (e.g., screen name, email alias) or telephone number to which the communication was sent with the role associated with that alias information, telephone number, or other contact means.

In accordance with some aspects, identifier module 212 can identify the sender information, such as the sender's telephone number, email alias, screen name, IP address, and so forth, and compare that information with one or more address book(s) or contact listing(s) that are accessible by system 200. The address book(s) or contact listing(s) in which the sender's information is found can identify the communication role (e.g., if found in the personal contact list it is a personal role; if found in a work address book the communication is intended for a work role).

In some situations, there might be more than one communication role determined by identifier module 212. This situation might occur if there is overlap and the communication could be for more than one role. For example, an incoming communication can be an invitation from an employer (e.g., boss) asking if an employee (e.g., recipient) would like to use a company resort for a family vacation. Identifier module 212 might indicate that the communication could be for a work role based on the sender (e.g. boss) or a family role based on the key words (e.g. resort, family, vacation). Identifier module 212 might choose one of the roles or might indicate that either role can be utilized for determining whether to transmit the communication to the recipient.

A persona module 214 can be configured to ascertain a recipient active role by establishing the current role in which the recipient is actively engaged when the communication is received. The persona module 214 can utilize various factors to ascertain the recipient active role. Such factors can include programs or applications active on recipient device, communications being viewed, drafted, or sent by the recipient at a similar time as the incoming communication is received. Other factors include a location of the device (and associated recipient) or a time of day or week. Additionally or alternatively, the recipient can manually change or identify the recipient active role. For example, the recipient (e.g., device user) can select from among the various roles that are (or that can be) associated with the recipient. The recipient can also set up parameters in the forms of rules or policies that should be followed when an incoming communication is received.

In accordance with some aspects, the persona module 214 might determine that a recipient could be engaged in activities associated with two or more recipient active roles. For example, persona module 214 can utilize location information of the device, a time of day/week, and/or applications currently running on a device. In this example, the location of the device indicates a work location, the time of day is known working hours of the recipient, the applications running on the device are personal applications (e.g., financial application) and the recipient is engaging in real-time communication with a close friend. In this situation, two criterions indicate a work role (e.g., location and time) and two criterions indicate a personal role (e.g., applications). Thus, persona module 214 can choose one of the roles based on which criterion has a higher weight or can indicate that either or both roles are the recipient active roles. For example, the applications might be given a higher weight because that is the activities that the recipient is currently engaged in (e.g., the recipient could be at work but taking a break or taking lunch at a different time).

A comparison module 216 can be configured to receive the information relating to the communication role and the recipient active role and compare the roles to ascertain if the roles match. In accordance with some aspects, comparison module 216 can choose between two or more communication roles and/or active recipient roles, if more than one role was provided by identifier module 212 and/or persona module 214.

The results of the matching are communicated to ranking component 204 that can be configured to prioritize each of the incoming communications. In accordance with some aspects, the incoming communication is prioritized if the communication role does not match the recipient active role. However, in accordance with some aspects, all incoming communications are prioritized. Based on the prioritization and the matching of the roles, rending component 206 can selectively present the incoming communication to the recipient in a perceivable format (e.g., audio, visual) or in a format preferred by the recipient (e.g., recipient is legally blind and all incoming communications are to be converted to audio).

Figure 3:
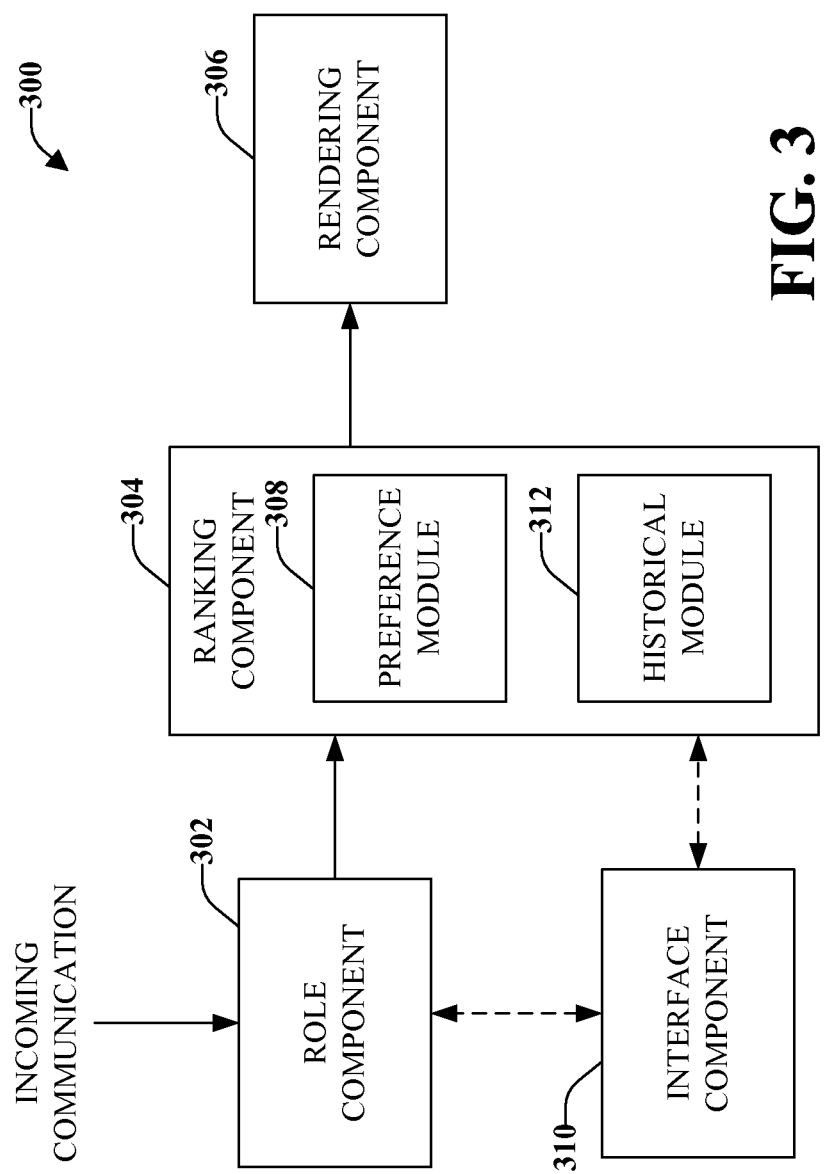
FIG. 3 illustrates a system that receives multiple persona communications at a single device and automatically conveys the communication to a recipient based on an importance level of the incoming communication.

FIG. 3 illustrates a system 300 that receives multiple persona communications at a single device and automatically conveys the communication to a recipient based on an importance level of the incoming communication. System 300 includes a role component 302 that receives an incoming communication and compares a communication role with a recipient active role. The recipient active role is a role in which a user is currently engaged and can be determined based on observed activities of the user, location of the device, time of day, or combinations thereof. A ranking component 304 priorities the incoming communication based on an importance level and a rendering component 306 that selectively outputs the incoming communication based on the comparison and the priority are also included in system 300. The incoming communication can be addressed or sent to one of a multitude of aliases associated with the recipient, wherein the multitude of aliases are routed through a single device.

To prioritize the communications, ranking component 304 can include, a preference module 308 that can be configured to assign a priority or weight to an incoming communication based on user preferences, which can be predefined or inferred. Various preferences can be established by a user (e.g., recipient of the communication). A preference can be that communications received from a particular sender be assigned a higher (or in some cases a lower) priority level. For example, a preference can be established that communications received from a spouse, child, boss, or other designated sender be automatically assigned a higher priority. Thus, the communication can be presented to the user, by rendering component 306, at substantially the same time as the communication is received, regardless of the communication role and/or the recipient active role. In another example, a communication from a particular sender can be automatically assigned a lower priority (or automatically ignored), and thus, not presented to the recipient if the roles do not match.

Another preference can be established so that communications containing certain key words and/or phrases be assigned a higher (or lower) weight or ranking Incoming communications that are in response to a previous communications sent by recipient (e.g., as a reply) can be assigned a higher weight, depending on the preference settings. Other settings can also be established by the user based on expected communications, situations, or based on other factors.

An interface component 310 can be associated with role component 302 and/or ranking component 304 to allow a recipient (e.g., device user) to interact with system 300. Interface component 310 can allow recipient to selectively modify or provide information to allow system 300 to receive multiple persona communications at a single device and automatically convey the communication to the recipient based on an importance level of the incoming communication. For example, interface component 310 can provide a graphical user interface (GUI), a command line interface, a speech interface, Natural Language text interface, and the like. For example, a GUI can be rendered that provides a user with a region or means to load, import, select, read, and so forth, information (e.g., recipient active role, preferences) and can include a region to present the results of such. These regions can comprise known text and/or graphic regions comprising dialogue boxes, static controls, drop-down-menus, list boxes, pop-up menus, as edit controls, combo boxes, radio buttons, check boxes, push buttons, and graphic boxes. In addition, utilities to facilitate the information conveyance such as vertical and/or horizontal scroll bars for navigation and toolbar buttons to determine whether a region will be viewable can be employed.

The user can also interact with the regions to select and provide information through various devices such as a mouse, a roller ball, a keypad, a keyboard, a pen, gestures captured with a camera, and/or voice activation, for example. Typically, a mechanism such as a push button or the enter key on the keyboard can be employed subsequent to entering the information in order to initiate information conveyance. However, it is to be appreciated that the disclosed embodiments are not so limited. For example, merely highlighting a check box can initiate information conveyance. In another example, a command line interface can be employed. For example, the command line interface can prompt the user for information by providing a text message, producing an audio tone, or the like. The user can then provide suitable information, such as alphanumeric input corresponding to an option provided in the interface prompt or an answer to a question posed in the prompt. It is to be appreciated that the command line interface can be employed in connection with a GUI and/or API. In addition, the command line interface can be employed in connection with hardware (e.g., video cards) and/or displays (e.g., black and white, and EGA) with limited graphic support, and/or low bandwidth communication channels.

Associated with ranking module 304 can be a historical module 312 that can be configured to evaluate the incoming communication and assign a weight or priority level based on how similar communications have been historically handled by the recipient and/or system 300. Historical module 312 can retain information relating to key words/phrases, the sender of the communication, or other information associated with the incoming communication. Historical module 312 can also retain information relating to an intended user role (e.g., communication role) assigned to similar communications (e.g., based on key words/phrases, sender of communication and so forth). Other information retained and utilized during analysis of an incoming communication can include the user actions upon receipt of a similar communication. For example, a prior incoming communication was a break-through communication (e.g., roles did not match but priority was high enough that communication was presented to the recipient at substantially the same time as receipt) and the user ignored the communication (e.g., listened to a voice mail and did not follow up, read an email and automatically deleted it, and so forth). This might indicate that the communication was not important and historical module 312 might infer that similar communications should be assigned lower priority.

Historical component 312 can include or have access to memory and/or some other medium that can store information. By way of example, and not limitation, the storage medium can include nonvolatile and/or volatile memory. Suitable nonvolatile memory can include read only memory (ROM), programmable ROM (PROM), electrically programmable ROM (EPROM), electrically erasable programmable ROM (EEPROM), or flash memory. Volatile memory can include random access memory (RAM), which acts as external cache memory. By way of example and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Figure 4:
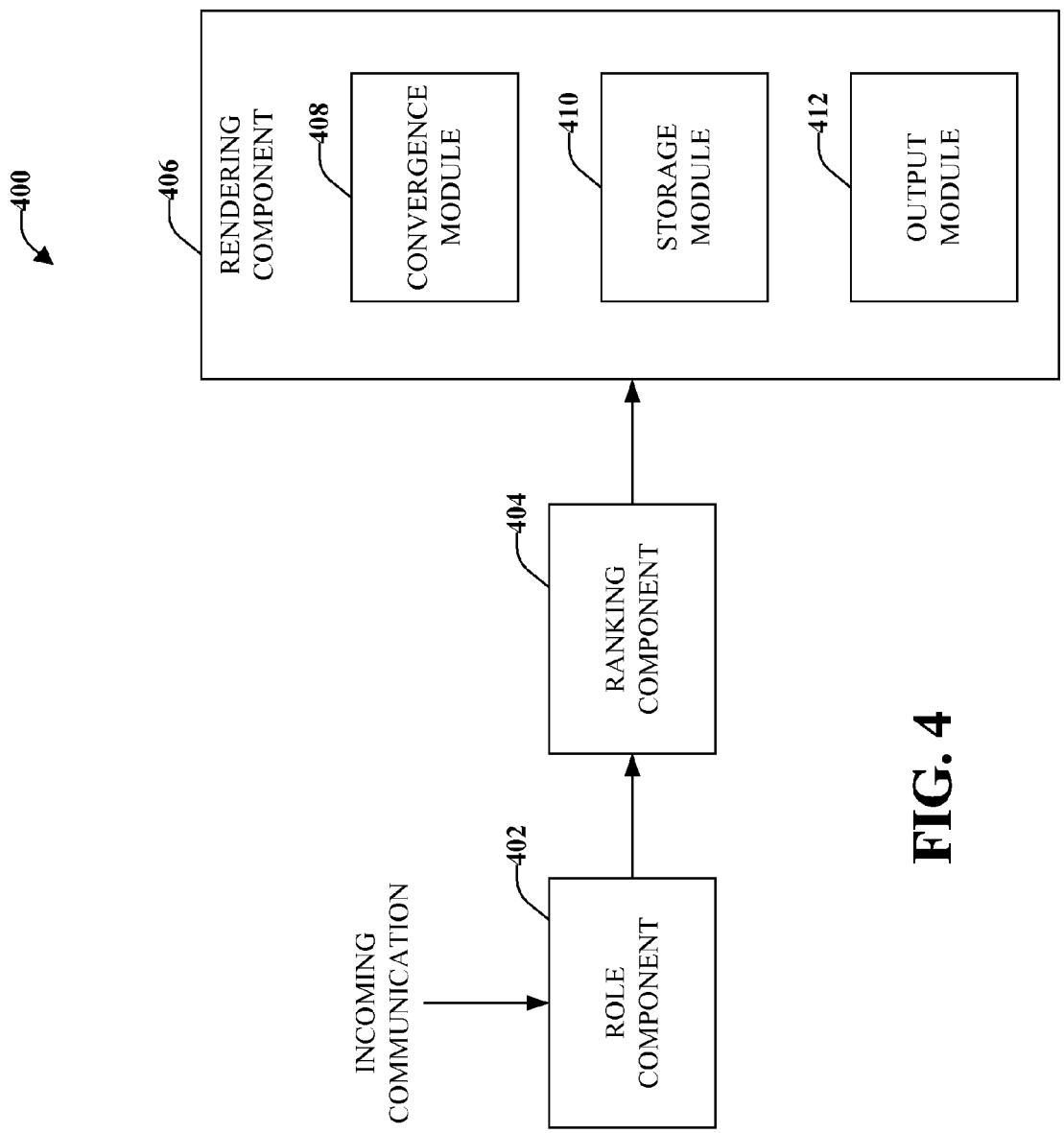
FIG. 4 illustrates a system for automatically delivering communications intended for disparate personas on a single device.

FIG. 4 illustrates a system 400 for automatically delivering communications intended for disparate personas on a single device, wherein the communications are prioritized and presented to the recipient at substantially the same time as receipt or maintained in a storage media to be presented at a later time. System 400 allows a user to maintain a single device for all incoming communications while providing the user with assurance that an important incoming communication will not be missed because the user is not currently engaged in the role for which the communication was intended.

System 400 is similar to the systems shown and described above and includes a role component 402 that matches a communication role with a receiver active role, a ranking component 404 that assigns a weight or priority to at least a subset of the incoming communications, and a rendering component 406 that selectively outputs the communication to a receiver based on the matching and the priority level.

The ranking component 404 can prioritize the incoming communication, wherein the prioritization indicates whether the communication is important enough that it should be presented to the recipient at substantially the same time as receipt (e.g., break-through). The importance of the communication can be based on various criteria, including rules, policies, inference, or other factors (e.g., the sender of the communication, user preferences, user specified communications, and so forth). Key words or phrases in the subject or body of the communication can be utilized to determine a priority of the communication (e.g., some key words or phrases are ranked a higher (or lower) priority than other communications). In some situations, a reply to an earlier communication, initiated by the user of the device or sent in reply to a previously received communication, can be utilized to determine if the current incoming communication should be ranked higher (or lower) than other communications. Based on the evaluation of the incoming communication and/or the comparison with other communications, ranking component 404 can indicate that the incoming communication is a priority communication (e.g., a high ranking) or not a priority communication (e.g., medium or low ranking)

Rendering component 406 can include a convergence module 408 that can be configured to automatically converge the roles if the importance or priority level of the communication meets or exceeds a threshold level. The convergence allows the individual to receive the urgent communication through a first persona (e.g., work persona), even though the communication was sent to a second persona (e.g., personal persona). As such, there is a convergence (or break-through) when a communication is deemed important enough to cross over or disregard roles (e.g., recipient active roles).

A storage module 410 associated with rendering component 406 can be configured to retain an incoming communication if there should not be a convergence of roles. As such, those communications are assigned a low ranking are maintained in storage module 410 and selectively presented to the user when there is a transition from a first recipient active role to a second active role. If the second active role matches the communication role, the communication is presented at substantially the same time as the transition. An output module 412 can present the communication to the recipient in any perceivable format, such as audibly through a speaker or visually through a display.

Figure 5:
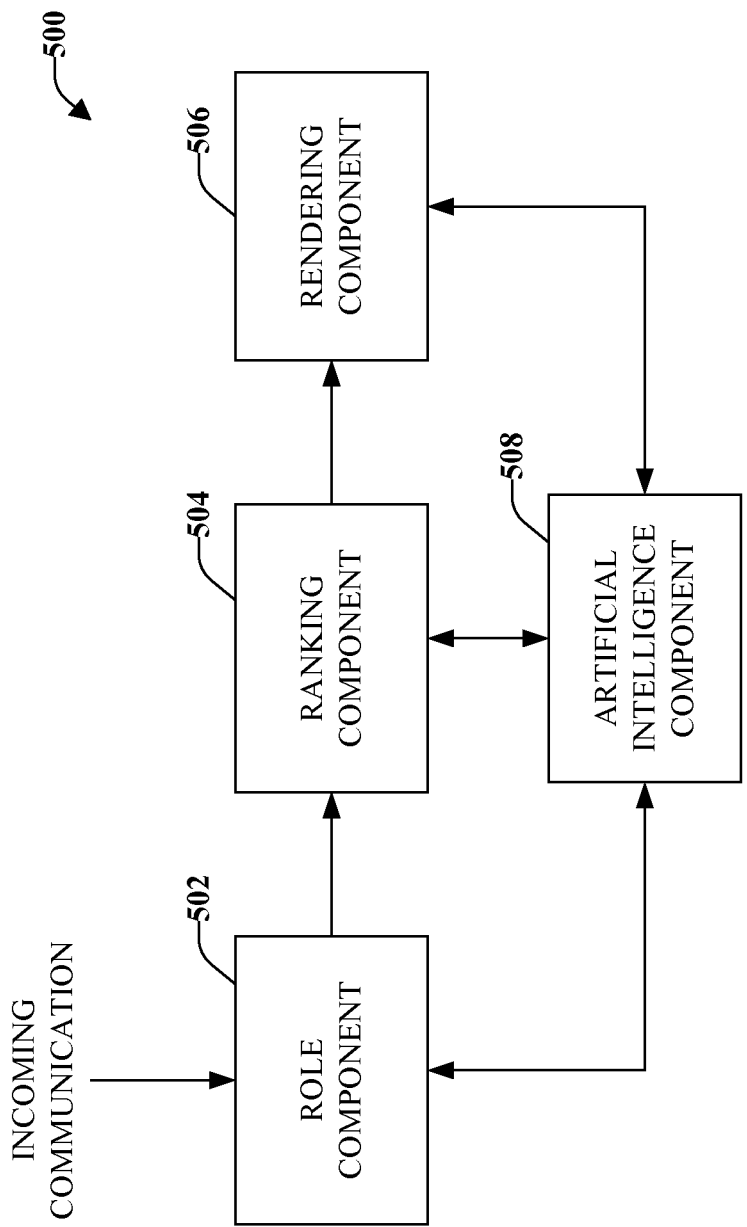
FIG. 5 illustrates a system that employs artificial intelligence, which facilitates automating one or more features in accordance with the one or more embodiments.

FIG. 5 illustrates a system 500 that employs artificial intelligence, which facilitates automating one or more features in accordance with the one or more embodiments. Artificial intelligence based systems (e.g., explicitly and/or implicitly trained classifiers) can be employed in connection with performing inference and/or probabilistic determinations and/or statistical-based determinations as in accordance with one or more aspects as described hereinafter. As used herein, the term "inference" refers generally to the process of reasoning about or inferring states of the system, environment, and/or user from a set of observations as captured through events, sensors, and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines . . . ) can be employed in connection with performing automatic and/or inferred action in connection with the subject embodiments.

System 500 includes a role component 502 that ascertains a communication role of an incoming communication and a recipient active role and compares the communication role with the active recipient role to determine if the roles match. A ranking component 504 can prioritize the incoming communication. Further, a rendering component 506 can selectively present the communication to the user based in part on the prioritization and the matching. The artificial intelligence can be facilitated by artificial intelligence component 508 as illustrated. The various embodiments (e.g., in connection with selectively rendering an incoming communication intended for a role other than a recipient active role on a single device) can employ various artificial intelligence-based schemes for carrying out various aspects thereof For example, a process for comparing the role for which the communication is intended with a recipient active role can be facilitated through an automatic classifier system and process. Moreover, when communications are received, at least a subset thereof can be assigned a priority or weight based on the inferred importance of the communication.

A classifier is a function that maps an input attribute vector, x=(x1, x2, x3, x4, xn), to a confidence that the input belongs to a class, that is, f(x)=confidence (class). Such classification can employ a probabilistic and/or statistical-based analysis (e.g., factoring into the analysis utilities and costs) to prognose or infer an action that a user desires to be automatically performed. In the case of incoming communications to a single device, for example, attributes can be words or phrases or other data-specific attributes derived from the words (e.g., address book, the presence of key terms), and the classes are categories or areas of interest (e.g., levels of priorities).

A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, for example, naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated from the subject specification, the one or more embodiments can employ classifiers that are explicitly trained (e.g., through a generic training data) as well as implicitly trained (e.g., by observing user behavior, receiving extrinsic information). For example, SVMs are configured through a learning or training phase within a classifier constructor and feature selection module. Thus, the classifier(s) can be used to automatically learn and perform a number of functions, including but not limited to determining according to a predetermined criteria when to grant access, which stored procedure to execute, etc. The criteria can include, but is not limited to, the amount of data or resources to access through a call, the type of data, the importance of the data, and so forth.

Figure 6:
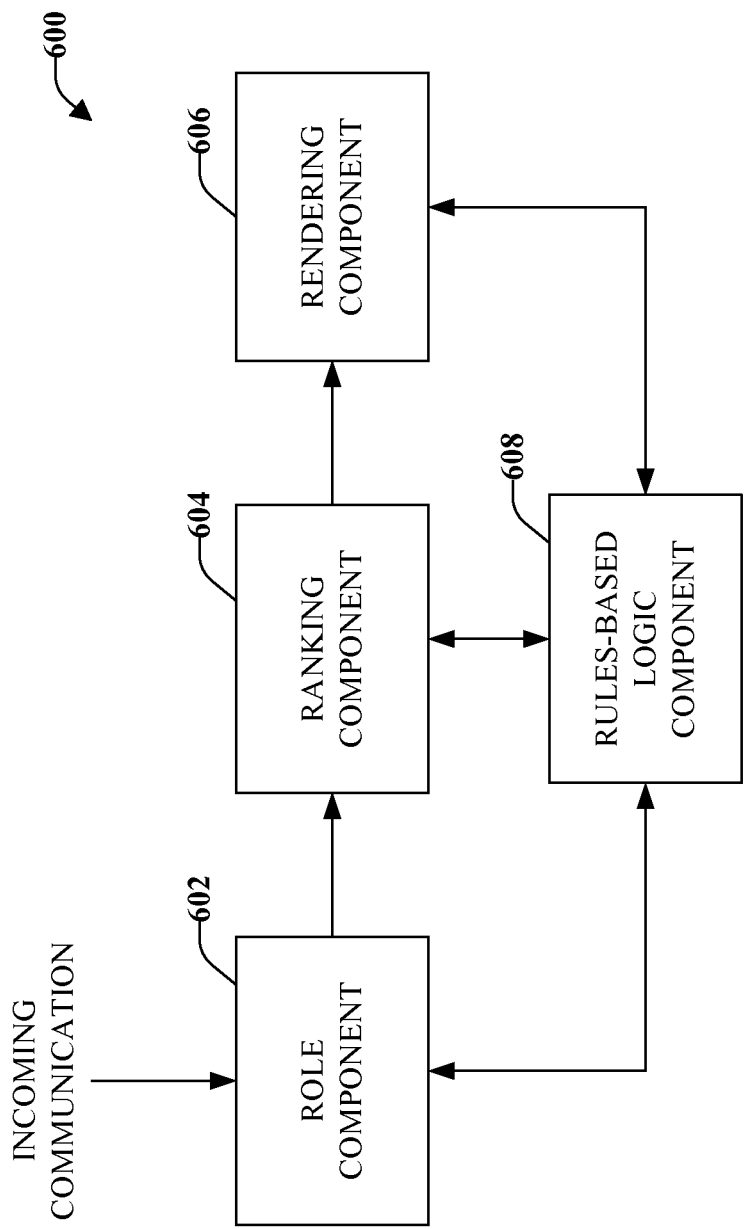
FIG. 6 illustrates aspects of a system for converging roles on a single device with multiple personas.

With reference now to FIG. 6 aspects of a system for converging roles on a single device with multiple personas 600 is illustrated. System 600 can include a role component 602 that matches a recipient active role with a communication role and a ranking component 604 that prioritizes incoming communications. A rendering component 606 can selectively output the communication based on the priority, the matching, or based on other criteria. System 600 can further include a rules-based logic component 608. In accordance with this alternate aspect, an implementation scheme (e.g., rule, policy) can be applied to control and/or regulate rending communications for multiple personas associated with a single individual on a single device. It will be appreciated that the rules-based implementation can automatically and/or dynamically regulate receipt and rendering of one or more communications based upon a predefined criterion or policies. In response thereto, the rule-based implementation can automatically assign a weight to a communication and present the communication or retain the communication for presentation later by employing a predefined and/or programmed rule(s) based upon any desired criteria (e.g., communication role, user role, data importance, user preferences, historical data, and so forth).

By way of example, a user can establish a rule that can require an incoming communication to meet a certain priority level or threshold before the communication is presented to the user if the communication role and recipient active role do not match. It is to be appreciated that any preference can be facilitated through pre-defined or pre-programmed in the form of a rule. It is to be appreciated that the rules-based logic described with reference to FIG. 6 can be employed in addition to or in place of the artificial intelligence-based components described with reference to FIG. 5.

In view of the exemplary systems shown and described above, methodologies that may be implemented in accordance with the disclosed subject matter are provided. While, for purposes of simplicity of explanation, the methodologies are shown and described as a series of blocks, it is to be understood and appreciated that the disclosed aspects are not limited by the number or order of blocks, as some blocks may occur in different orders and/or concurrently with other blocks from what is depicted and described herein. Moreover, not all illustrated blocks may be required to implement the methodologies described hereinafter. It is to be appreciated that the functionality associated with the blocks may be implemented by software, hardware, a combination thereof or any other suitable means (e.g. device, system, process, component). Additionally, it should be further appreciated that the methodologies disclosed hereinafter and throughout this specification are capable of being stored on an article of manufacture to facilitate transporting and transferring such methodologies to various devices. Those skilled in the art will understand and appreciate that a methodology could alternatively be represented as a series of interrelated states or events, such as in a state diagram.

Figure 7:
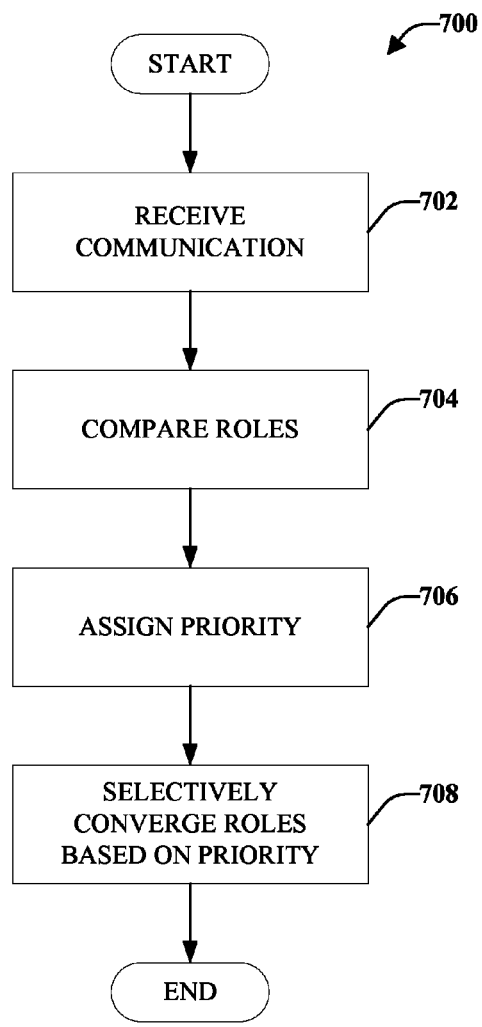
FIG. 7 illustrates a method for selectively allowing an important communication to be rendered on a device regardless of the role for which the communication was sent.

FIG. 7 illustrates a method 700 for selectively allowing an important communication to be rendered on a device regardless of the role for which the communication was sent. Each user can be performing a different role at any time of day. For example, while a user is at the office, the user is performing an office or work role. While the user is grocery shopping, that user might be performing a personal or family role. The initiator of a communication might not be aware or concerned with the role that the user is performing at any given time. The communications can be selectively presented to the user based on a current active role, while allowing important communications to be presented regardless of whether the role for which the communication is intended matches the current active role.

Method 700 starts, at 702, when a communication intended for one or more user roles is received at a single device. The communications can be sent by various means and can be addressed to different aliases associated with the user. However, all the communications are routed to a single device. In such a manner, a user can utilize a single device rather than having multiple devices, each device associated with a different user role.

At 704, the role that the communication was sent to is compared or matched with a current role in which the user is engaged. Such comparison and identification of roles can include evaluating each communication for various criteria. Such criteria can include, but is not limited to, a contact name or alias information (including telephone number, screen name and so forth) of the recipient of the communication (device user), contact name or alias information of the sender of the communication, historical information, manually configured information, location of the device, time of day, and so forth. For example, ascertaining an intended role can include comparing a sender of the communication with information contained in a contact database. Identifying and analyzing the current role of the user can include determining a current user activity. This determination can include observing the activities of the user, a current location of the user or user device, such as by a Global Positioning System (GPS) or other locating means, historical information, time of day, a manual selection by the user, or based on other criteria.

A priority or importance level is assigned to one or more incoming communications, at 704. Various criteria can be utilized the assign the priority or relative importance of the communication. Such criteria includes key words or phrases included in the communication, sender of the communication, historical information (e.g., how similar communications were handled by recipient in the past), the intended communication role, user preferences, policies, as well as other factors.

At 708, the current user role and the role for which the communication is intended is selectively converged if the importance level meets or exceeds a threshold level. If the roles are converged, the communication can be selectively rendered or output on a user device. Thus, if the roles do not match but the priority level meets or exceeds the threshold level, the communication can be presented to the user. In accordance with some aspects, if the roles match, the communication is automatically presented to the user and convergence is not necessary. The communication might not be rendered if a communication role does not match a recipient active role and the priority level or importance level does not meet (is below) a certain threshold. In accordance with some aspects, if the roles do not match and the importance level is not high enough to cause convergence of the roles, the communication is maintained in a storage medium until there is a transition between roles and the intended role matches the current user role.

Figure 8:
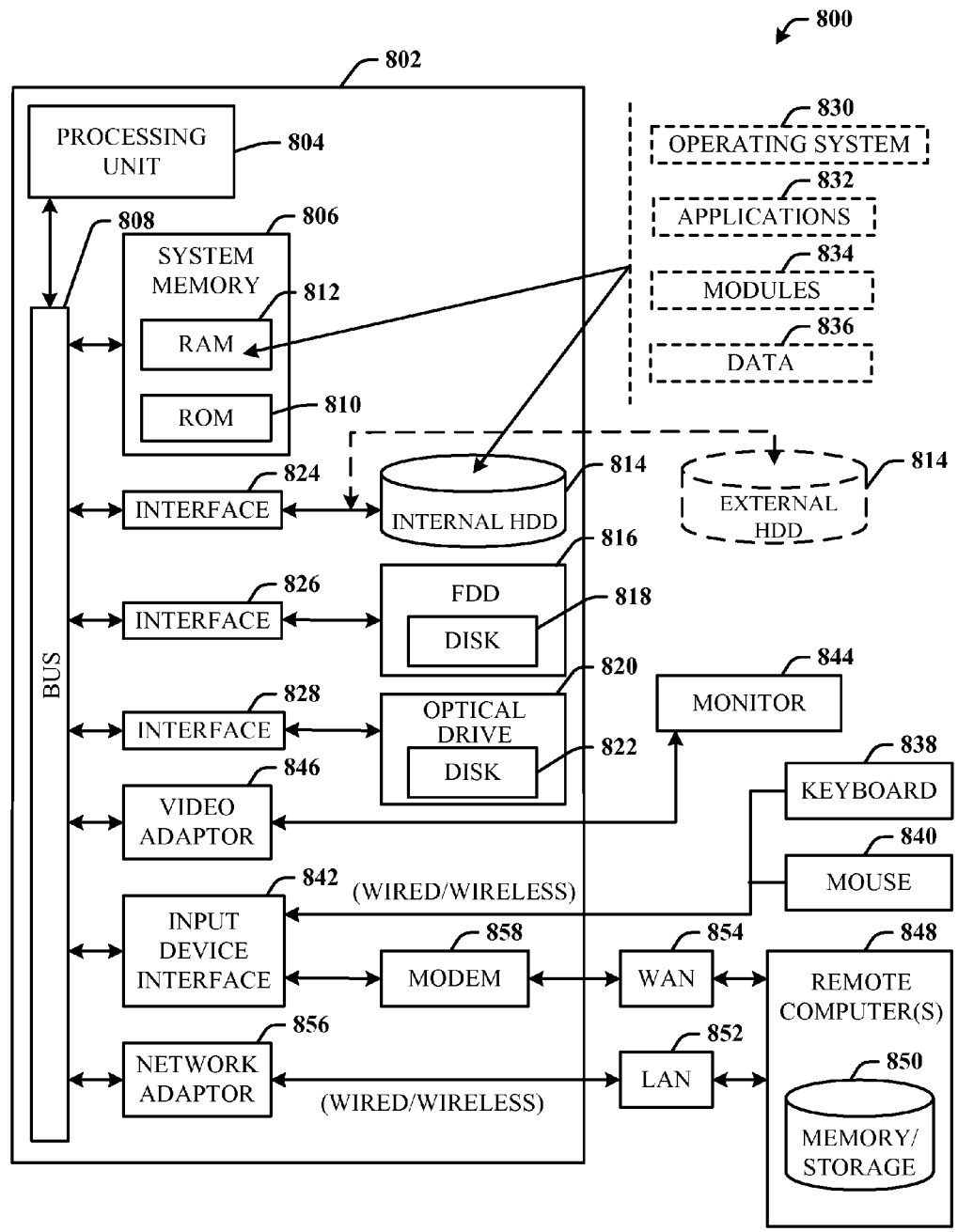
FIG. 8 illustrates a block diagram of a computer operable to execute the disclosed embodiments.

Referring now to FIG. 8, there is illustrated a block diagram of a computer operable to execute the disclosed architecture. In order to provide additional context for various aspects disclosed herein, FIG. 8 and the following discussion are intended to provide a brief, general description of a suitable computing environment 800 in which the various aspects can be implemented. While the one or more aspects have been described above in the general context of computer-executable instructions that may run on one or more computers, those skilled in the art will recognize that the various aspects also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 8, the exemplary environment 800 for implementing various aspects includes a computer 802, the computer 802 including a processing unit 804, a system memory 806 and a system bus 808. The system bus 808 couples system components including, but not limited to, the system memory 806 to the processing unit 804. The processing unit 804 can be any of various commercially available processors. Dual microprocessors and other multi-processor architectures may also be employed as the processing unit 804.

The system bus 808 can be any of several types of bus structure that may further interconnect to a memory bus (with or without a memory controller), a peripheral bus, and a local bus using any of a variety of commercially available bus architectures. The system memory 806 includes read-only memory (ROM) 810 and random access memory (RAM) 812. A basic input/output system (BIOS) is stored in a non-volatile memory 810 such as ROM, EPROM, EEPROM, which BIOS contains the basic routines that help to transfer information between elements within the computer 802, such as during start-up. The RAM 812 can also include a high-speed RAM such as static RAM for caching data.

The computer 802 further includes an internal hard disk drive (HDD) 814 (e.g., EIDE, SATA), which internal hard disk drive 814 may also be configured for external use in a suitable chassis (not shown), a magnetic floppy disk drive (FDD) 816, (e.g., to read from or write to a removable diskette 818) and an optical disk drive 820, (e.g., reading a CD-ROM disk 822 or, to read from or write to other high capacity optical media such as the DVD). The hard disk drive 814, magnetic disk drive 816 and optical disk drive 820 can be connected to the system bus 808 by a hard disk drive interface 824, a magnetic disk drive interface 826 and an optical drive interface 828, respectively. The interface 824 for external drive implementations includes at least one or both of Universal Serial Bus (USB) and IEEE 1394 interface technologies. Other external drive connection technologies are within contemplation of the one or more aspects.

The drives and their associated computer-readable media provide nonvolatile storage of data, data structures, computer-executable instructions, and so forth. For the computer 802, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods disclosed herein.

A number of program modules can be stored in the drives and RAM 812, including an operating system 830, one or more application programs 832, other program modules 834 and program data 836. All or portions of the operating system, applications, modules, and/or data can also be cached in the RAM 812. It is appreciated that the various aspects can be implemented with various commercially available operating systems or combinations of operating systems.

A user can enter commands and information into the computer 802 through one or more wired/wireless input devices, e.g., a keyboard 838 and a pointing device, such as a mouse 840. Other input devices (not shown) may include a microphone, an IR remote control, a joystick, a game pad, a stylus pen, touch screen, or the like. These and other input devices are often connected to the processing unit 804 through an input device interface 842 that is coupled to the system bus 808, but can be connected by other interfaces, such as a parallel port, an IEEE 1394 serial port, a game port, a USB port, an IR interface, etc.

A monitor 844 or other type of display device is also connected to the system bus 808 through an interface, such as a video adapter 846. In addition to the monitor 844, a computer typically includes other peripheral output devices (not shown), such as speakers, printers, etc.

The computer 802 may operate in a networked environment using logical connections through wired and/or wireless communications to one or more remote computers, such as a remote computer(s) 848. The remote computer(s) 848 can be a workstation, a server computer, a router, a personal computer, portable computer, microprocessor-based entertainment appliance, a peer device or other common network node, and typically includes many or all of the elements described relative to the computer 802, although, for purposes of brevity, only a memory/storage device 850 is illustrated. The logical connections depicted include wired/wireless connectivity to a local area network (LAN) 852 and/or larger networks, e.g., a wide area network (WAN) 854. Such LAN and WAN networking environments are commonplace in offices and companies, and facilitate enterprise-wide computer networks, such as intranets, all of which may connect to a global communications network, e.g., the Internet.

When used in a LAN networking environment, the computer 802 is connected to the local network 852 through a wired and/or wireless communication network interface or adapter 856. The adaptor 856 may facilitate wired or wireless communication to the LAN 852, which may also include a wireless access point disposed thereon for communicating with the wireless adaptor 856.

When used in a WAN networking environment, the computer 802 can include a modem 858, or is connected to a communications server on the WAN 854, or has other means for establishing communications over the WAN 854, such as by way of the Internet. The modem 858, which can be internal or external and a wired or wireless device, is connected to the system bus 808 through the serial port interface 842. In a networked environment, program modules depicted relative to the computer 802, or portions thereof, can be stored in the remote memory/storage device 850. It will be appreciated that the network connections shown are exemplary and other means of establishing a communications link between the computers can be used.

The computer 802 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from home, in a hotel room, or at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10 BaseT wired Ethernet networks used in many offices.

Figure 9:
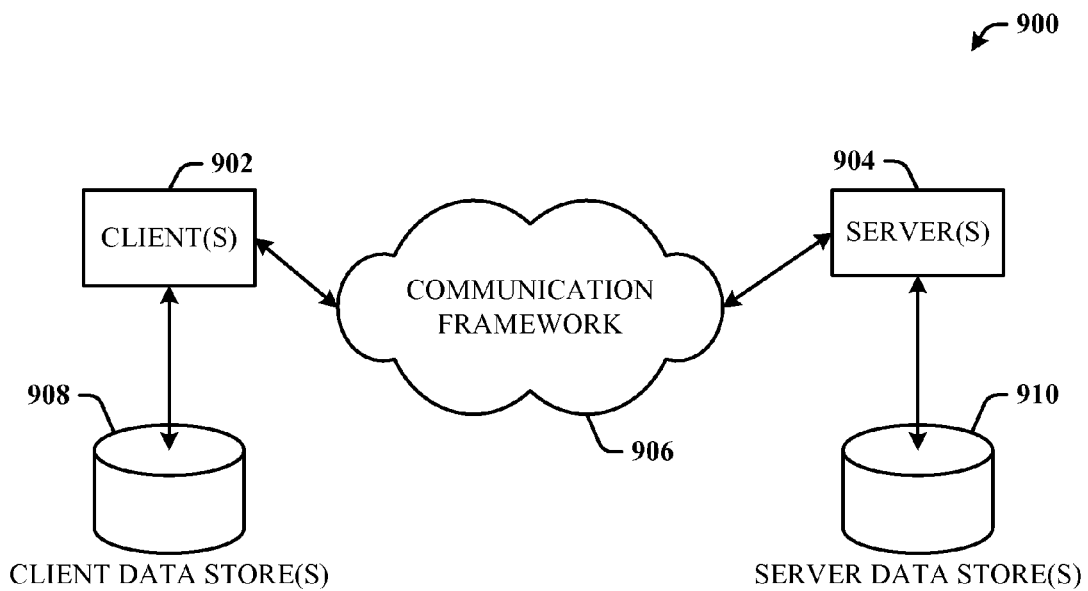
FIG. 9 illustrates a schematic block diagram of an exemplary computing environment operable to execute the disclosed embodiments.

Referring now to FIG. 9, there is illustrated a schematic block diagram of an exemplary computing environment 900 in accordance with the various aspects. The system 900 includes one or more client(s) 902. The client(s) 902 can be hardware and/or software (e.g., threads, processes, computing devices). The client(s) 902 can house cookie(s) and/or associated contextual information by employing the various aspects, for example.

The system 900 also includes one or more server(s) 904. The server(s) 904 can also be hardware and/or software (e.g., threads, processes, computing devices). The servers 904 can house threads to perform transformations by employing the various aspects, for example. One possible communication between a client 902 and a server 904 can be in the form of a data packet adapted to be transmitted between two or more computer processes. The data packet may include a cookie and/or associated contextual information, for example. The system 900 includes a communication framework 906 (e.g., a global communication network such as the Internet) that can be employed to facilitate communications between the client(s) 902 and the server(s) 904.

Communications can be facilitated through a wired (including optical fiber) and/or wireless technology. The client(s) 902 are operatively connected to one or more client data store(s) 908 that can be employed to store information local to the client(s) 902 (e.g., cookie(s) and/or associated contextual information). Similarly, the server(s) 904 are operatively connected to one or more server data store(s) 910 that can be employed to store information local to the servers 904.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification intended to embrace all such alterations, modifications, and variations.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects. In this regard, it will also be recognized that the various aspects include a system as well as a computer-readable medium having computer-executable instructions for performing the acts and/or events of the various methods.

In addition, while a particular feature may have been disclosed with respect to only one of several implementations, such feature may be combined with one or more other features of the other implementations as may be desired and advantageous for any given or particular application. To the extent that the terms "includes," and "including" and variants thereof are used in either the detailed description or the claims, these terms are intended to be inclusive in a manner similar to the term "comprising." The term "or" as used in either the detailed description of the claims is meant to be a "non-exclusive or".

The word "exemplary" as used herein to mean serving as an example, instance, or illustration. Any aspect or design described herein as "exemplary" is not necessarily to be construed as preferred or advantageous over other aspects or designs.

Furthermore, the one or more aspects may be implemented as a method, apparatus, or article of manufacture using standard programming and/or engineering techniques to produce software, firmware, hardware, or any combination thereof to control a computer to implement the disclosed aspects. The term "article of manufacture" (or alternatively, "computer program product") as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope of the disclosed aspects.

What is claimed is:

1. A system for persona breakthrough for priority communications, comprising:
    one or more processors; and
    a memory that includes a plurality of computer-executable components which are operable by the one or more processors, the plurality of computer-executable components comprising:
        a role component that:
            ascertains a communication role of an incoming communication by evaluating one or more phrases of the incoming communication, wherein the communication role is one of a plurality of roles associated with a recipient that the incoming communication is assigned to; and
            ascertains a recipient active role based on at least one of location information of a device that receives the incoming communication, a time when the incoming communication is received or an application that is currently running on the device;
        a ranking component that lowers a priority of the incoming communication in response to determining that the incoming communication is similar to a previously received and ignored break-through communication, the break-through communication associated with a previous communication role that did not match a previous recipient active role; and
        a rendering component that presents the communication to a user in response to a determination that:
            the communication role matches the recipient active role, or
            the communication role does not match the recipient active role and the priority of the incoming communication is greater than a predetermined threshold level.

2. The system of claim 1, wherein the ranking component increases the priority of the incoming communication based on a sender identification included in the incoming communication.

3. The system of claim 1, wherein the rendering component does not output the communication if the communication role does not match the recipient active role and the priority of the incoming communication does not meet a threshold level.

4. The system of claim 1, wherein the ranking component increases the priority of the incoming communication based on a plurality of key words included in the incoming communication.

5. The system of claim 1, wherein the incoming communication is addressed to one of a plurality of aliases that are routed through a single device.

6. The system of claim 1, wherein the ranking component prioritizes the incoming communication based on an importance level.

7. The system of claim 1, wherein the recipient active role is a role in which a user is currently engaged.

8. The system of claim 1, wherein the priority is based in part on a user preference.

9. The system of claim 1, wherein the recipient active role is further based on activities that a user is currently engaged in.

10. The system of claim 1, further comprising an artificial intelligence component that automates one or more system components.

11. A computer-implemented method for selectively converging user roles when an important communication is received, comprising:
    under control of one or more computing systems comprising one or more processors:
        receiving a communication intended for at least one alias associated with a user;
        determining a communication role and a current user role, the current user role being ascertained based on at least location information of a device that receives the incoming communication, wherein the communication role is one of a plurality of roles associated with the user that the incoming communication is assigned to;
        assigning a priority level for the communication in response to determining that the communication is similar to a previously received and ignored break-through communication, the break-through communication associated with a previous communication role that did not match a previous current user role;
        in response to a determination that the priority level meets or exceeds a threshold level and that the current user role is different than the communication role, selectively converging the current user role and the communication role to allow the user to receive the communication through the current user role; and
        in response to a determination that the priority level neither meets nor exceeds the threshold level, retaining the communication in storage until a transition of the current user role is made such that the communication role matches the current user role.

12. The computer-implemented method of claim 11, wherein selectively converging the roles comprises presenting the communication on an output device.

13. The computer-implemented method of claim 11, wherein the roles are not converged if the priority level is below the threshold level.

14. The computer-implemented method of claim 11, wherein the incoming communication is addressed to one of a plurality of aliases that are routed through a single device.

15. The computer-implemented method of claim 11, wherein the incoming communication is presented if the intended role matches the current user role, and wherein the current user role is based in part on at least one of locations of the user, a time, or applications currently used by the user.

16. The computer-implemented method of claim 11, wherein determining the communication role comprises comparing information associated with a sender of the communication with information contained in a contact database.

17. A computer-readable storage device comprising computer executable instructions that, when executed, perform acts comprising:
    determining a communication role of an incoming communication, wherein the communication role is one of a plurality of roles associated with a recipient that the incoming communication is assigned to;
    ascertaining a current role of a recipient of the incoming communication based on at least a first weight associated with a first criterion for location information of a device that receives the incoming communication, and a second weight associated with a second criterion for an application that is currently running on the device, wherein the first weight of the first criterion is different than the second weight of the second criterion;
    determining whether the communication role matches the current role;
    in response to a determination that the communication role matches the current role, presenting the incoming communication; and
    in response to a determination that the communication role does not match the current role:
    determining a priority level of the incoming communication based on an identity of a sender of the incoming communication and historical information associated with the incoming communication; and
    interrupting a current activity of a user if the priority level meets or exceeds a threshold level.

18. The computer-readable storage device of claim 17, wherein the acts further comprise retaining the incoming communication if the priority level does not meet the threshold level and the current role and the communication role do not match.

19. The computer-readable storage device of claim 17, wherein the historical information associated with the incoming communication includes information of ignored incoming communications.

20. The computer-readable storage device of claim 17, wherein determining the priority level to the incoming communication is further based on a key word of the incoming communication.

* * * * *